US011924327B2

(12) United States Patent
El-Moussa et al.

(10) Patent No.: US 11,924,327 B2
(45) Date of Patent: Mar. 5, 2024

(54) VARIABLE DATA PROTECTION

(71) Applicant: BRITISH TELECOMMUNICATIONS PUBLIC LIMITED COMPANY, London (GB)

(72) Inventors: Fadi El-Moussa, London (GB); Fabio Giubilo, London (GB)

(73) Assignee: British Telecommunications Public Limited Company, London (GB)

( * ) Notice: Subject to any disclaimer, the term of this patent is extended or adjusted under 35 U.S.C. 154(b) by 264 days.

(21) Appl. No.: 17/310,015

(22) PCT Filed: Dec. 18, 2019

(86) PCT No.: PCT/EP2019/085937
§ 371 (c)(1),
(2) Date: Jul. 9, 2021

(87) PCT Pub. No.: WO2020/144027
PCT Pub. Date: Jul. 16, 2020

(65) Prior Publication Data
US 2022/0060316 A1     Feb. 24, 2022

(30) Foreign Application Priority Data

Jan. 9, 2019   (EP) ..................................... 19150865

(51) Int. Cl.
*H04L 9/06* (2006.01)
*H04L 9/08* (2006.01)

(52) U.S. Cl.
CPC ............ *H04L 9/065* (2013.01); *H04L 9/0631* (2013.01); *H04L 9/0643* (2013.01); *H04L 9/085* (2013.01)

(58) Field of Classification Search
CPC ... G06F 21/606; G06F 21/62; H04L 2209/16; H04L 2209/34; H04L 63/0428;
(Continued)

(56) References Cited

U.S. PATENT DOCUMENTS

| | | | | | |
|---|---|---|---|---|---|
| 5,412,729 | A | * | 5/1995 | Liu | ........................ H04L 9/0838 380/37 |
| 5,539,827 | A | * | 7/1996 | Liu | ........................ H04L 9/0838 380/37 |

(Continued)

FOREIGN PATENT DOCUMENTS

| | | |
|---|---|---|
| EP | 1193666 A1 | 4/2002 |
| EP | 1193666 B1 | 6/2006 |

(Continued)

OTHER PUBLICATIONS

Bosch, C., "A survey of provably secure searchable encryption", 2014, 51 pages.

(Continued)

*Primary Examiner* — Sharon S Lynch
(74) *Attorney, Agent, or Firm* — Pranger Law PC (57) ABSTRACT

Systems and methods of protecting data in a message for communication from a sender to a receiver, the sender and receiver sharing a secret including splitting the message into a number of ordered message blocks, the order being a proper order such that an aggregation of the blocks in the proper order constitutes the message; generating an encoded indication of a position of the block in the proper order of blocks, the encoding being reversible and based on at least a hash value for the block, a secret shared between the sender and the receiver, and a position of the block in the proper order; communicating the blocks and the encoded indications to the receiver, the blocks being communicated in an order different to the proper order so as to obfuscate the message, such that the blocks can be reassembled by the receiver in the proper order on the basis of the shared secret.

14 Claims, 7 Drawing Sheets

(58) Field of Classification Search
CPC ..... H04L 9/0643; H04L 9/085; H04L 9/3242; H04W 12/033

See application file for complete search history.

(56) References Cited

U.S. PATENT DOCUMENTS

| Patent/Pub No. | | Date | Inventor | Classification |
|---|---|---|---|---|
| 5,757,913 | A * | 5/1998 | Bellare | H04L 9/3297 713/168 |
| 6,061,449 | A * | 5/2000 | Candelore | G06F 21/14 713/168 |
| 6,631,419 | B1 * | 10/2003 | Greene | H04L 45/54 370/392 |
| 7,801,306 | B2 * | 9/2010 | Reitmeier | H04N 21/8358 380/240 |
| 8,879,727 | B2 * | 11/2014 | Taylor | H04L 9/0618 380/42 |
| 9,009,495 | B2 * | 4/2015 | Daniel | H04L 9/0816 713/193 |
| 9,311,494 | B2 | 4/2016 | Fujii et al. | |
| 9,363,078 | B2 * | 6/2016 | Taylor | H04L 9/0844 |
| 9,521,128 | B2 * | 12/2016 | Finlow-Bates | H04L 63/0876 |
| 9,537,650 | B2 | 1/2017 | Auradkar et al. | |
| 9,635,011 | B1 * | 4/2017 | Wu | H04L 9/3297 |
| 9,942,046 | B2 * | 4/2018 | Drego | H04L 9/3239 |
| 9,985,780 | B2 * | 5/2018 | Yamada | H04L 9/0643 |
| 10,021,085 | B1 * | 7/2018 | Wu | H04L 9/0861 |
| 10,313,231 | B1 * | 6/2019 | Bosshart | H04L 45/44 |
| 10,348,693 | B2 | 7/2019 | Auradkar et al. | |
| 10,521,612 | B2 * | 12/2019 | Arad | G06F 21/6254 |
| 10,892,921 | B2 * | 1/2021 | Nagata | H04L 9/14 |
| 2001/0021254 | A1 * | 9/2001 | Furuya | H04L 9/0625 380/259 |
| 2002/0152218 | A1 * | 10/2002 | Moulton | G06F 16/137 |
| 2004/0208318 | A1 * | 10/2004 | Henry | G06F 9/30007 380/46 |
| 2004/0228479 | A1 * | 11/2004 | Crispin | G06F 9/30007 712/E9.032 |
| 2009/0041235 | A1 * | 2/2009 | Reitmeier | H04N 21/8358 380/42 |
| 2009/0060197 | A1 * | 3/2009 | Taylor | H04L 9/0844 380/29 |
| 2009/0265397 | A1 * | 10/2009 | Williams | G06F 13/385 |
| 2010/0189257 | A1 * | 7/2010 | Bjorkengren | H04N 21/42623 380/268 |
| 2010/0303229 | A1 * | 12/2010 | Unruh | H04L 9/0643 380/28 |
| 2011/0145593 | A1 | 6/2011 | Auradkar et al. | |
| 2012/0082310 | A1 * | 4/2012 | Rashkovskiy | H04N 21/2347 380/255 |
| 2012/0147988 | A1 * | 6/2012 | Neeman | H03M 13/2957 375/295 |
| 2012/0221854 | A1 * | 8/2012 | Orsini | H04L 63/04 713/167 |
| 2012/0222134 | A1 * | 8/2012 | Orsini | G06F 21/62 726/28 |
| 2012/0226904 | A1 * | 9/2012 | Orsini | G06F 21/6218 713/167 |
| 2012/0255034 | A1 * | 10/2012 | Orsini | H04L 9/3226 726/28 |
| 2012/0255035 | A1 * | 10/2012 | Orsini | H04L 63/04 726/28 |
| 2013/0024933 | A1 * | 1/2013 | Jakobsson | G06F 21/567 726/22 |
| 2013/0067225 | A1 * | 3/2013 | Shochet | H04L 9/0662 713/165 |
| 2013/0232578 | A1 * | 9/2013 | Chevallier-Mames | G06F 21/10 726/26 |
| 2013/0276074 | A1 * | 10/2013 | Orsini | H04L 9/3226 726/5 |
| 2014/0331044 | A1 | 11/2014 | Fujii et al. | |
| 2015/0006913 | A1 * | 1/2015 | Daniel | G06F 21/602 713/193 |
| 2015/0023501 | A1 * | 1/2015 | Taylor | H04L 9/0861 380/44 |
| 2015/0381582 | A1 * | 12/2015 | O'Hare | H04L 63/0428 713/189 |
| 2016/0134601 | A1 * | 5/2016 | Finlow-Bates | G09C 1/00 713/165 |
| 2016/0330031 | A1 * | 11/2016 | Drego | H04L 9/3239 |
| 2018/0240191 | A1 | 8/2018 | Aronson | |
| 2018/0367509 | A1 * | 12/2018 | O'Hare | G06F 21/606 |
| 2018/0373885 | A1 * | 12/2018 | Arad | G06F 21/6254 |
| 2019/0007390 | A1 * | 1/2019 | Wu | H04L 9/3226 |
| 2019/0132162 | A1 * | 5/2019 | Nagata | H04L 9/14 |
| 2019/0273781 | A1 | 9/2019 | Daniel et al. | |
| 2020/0153813 | A1 * | 5/2020 | Wu | H04L 9/14 |
| 2020/0204197 | A1 * | 6/2020 | Maunder | H03M 13/6508 |
| 2021/0194800 | A1 * | 6/2021 | Bosshart | H04L 69/325 |
| 2021/0211271 | A1 * | 7/2021 | Kuang | H04L 9/3239 |

FOREIGN PATENT DOCUMENTS

| | | | |
|---|---|---|---|
| EP | 2392097 | A1 | 12/2011 |
| EP | 2584732 | A1 | 4/2013 |
| EP | 2584732 | B1 | 10/2016 |
| WO | WO-2016073148 | A1 | 5/2016 |

OTHER PUBLICATIONS

Combination Search and Examination Report under Sections 17 & 18(3) for Great Britain Application No. 1900270.8, dated Jun. 7, 2019, 6 pages.

Combined search and Examination Report for Great Britain Application No. 1900271.6, dated Jun. 7, 2019, 6 pages.

Curtmol R., et al., "Searchable Symmetric Encryption: Improved Definitions and Efficient Constructions," 2006, 33 pages.

Extended European Search Report for European Application No. 19150868.8, dated Jul. 9, 2019, 5 pages.

Extended European Search Report for European Application No. 19217451.4, dated Apr. 30, 2020, 6 pages.

Extended European Search Report for Application No. 19150865.4, dated Jul. 12, 2019, 8 pages.

Extended European Search Report for Application No. EP19160215.0, dated Jul. 22, 2019, 5 pages.

Girme M R., et al., "Efficient Secure Ranked keyword search Algorithms over outsource cloud data," Sep.-Oct. 2013, 5 pages.

Golle P., et al., "Secure Conjunctive Keyword Search Over Encrypted Data", 2004, 15 pages.

Hwang Y H., et al., "Public key encryption with conjunctive keyword search and its extension to a multi-user system," 2007, 19 pages.

International Preliminary Report on Patentability for Application No. PCT/EP2019/085937, dated Jul. 22, 2021, 8 pages.

International Search Report and Written Opinion for Application No. PCT/EP2019/085937, dated Jan. 31, 2020, 13 pages.

Kamara S et al., "Dynamic searchable symmetric encryption," 2012, 24 Pages.

Li et al., "Fuzzy Keyword Search over Encrypted Data in Cloud Computing," 2010, 5 pages.

Li et al., "Security Analysis on One-to-Many Order Preserving Encryption BasedCloud Data Search," 2015, vol. 10, No. 9, 9 pages.

Liesdonk P V., et al., "Computationally efficient searchable symmetric encryption," 2010, 14 pages.

Pastoriza T., et al., "Privacy-preserving error resilient DNA searching through oblivious automata," 2007, 10 pages.

Popa R A., et al., "Multi-key searchable encryption," 2013, 18 pages.

Song, "Computationally efficient searchable symmetric encryption", 2010, 178 pages.

Song X., et al., "Forward Private Searchable Symmetric Encryption with Optimized 110Efficiency," Sep. 30, 2017, 15 pages.

Tahir S., et al.,"A Ranked Searchable Encryption Scheme for Encrypted DataHosted on the Public Cloud," IEEE, 2017, 6 pages.

Tang Q., "Nothing is for Free: Security in Searching Shared & EncryptedData," 2014, 13 pages.

(56) References Cited

OTHER PUBLICATIONS

Wang B., et al. "Geometric Range Search on Encrypted Spatial Data," Apr. 2016, 16 pages.

Wang C., et al., "Enabling Secure and Efficient Ranked Keyword Search OverOutsourced Cloud Data," Aug. 2012, 13 pages.

Wang C., et al., "Secure Ranked Keyword Search over Encrypted Cloud Data," 2010, 10 pages.

Xiao M., et al., "A Hybrid Scheme for Fine-Grained Search and Access Authorization in Fog Computing Environment," Sensors, vol. 17 (6), Apr. 6, 2017, 22 pages.

* cited by examiner

VARIABLE DATA PROTECTION

PRIORITY CLAIM

The present application is a National Phase entry of PCT Application No. PCT/EP2019/085937, filed Dec. 18, 2019, which claims priority from EP Application No. 19150865.4, filed Jan. 9, 2019, which is hereby fully incorporated herein by reference.

TECHNICAL FIELD

The present disclosure relates to protecting data. In particular, it relates to impeding access to data from high volume data sources with a varying degree of data protection in dependence on the capabilities of systems.

BACKGROUND

A volume of data generated by devices and appliances and communicated and/or received via networks is large and increasing. Such devices and appliances can include, for example and inter alia: domestic appliances; entertainment devices; physical or virtualized computer systems; telephony devices; personal portable equipment; health and/or exercise devices; sensors; switches; medical devices; fittings and furnishings; meters; security systems; cameras; alarms; smart city devices; monitors; environmental monitors and/or sensors; vehicles; wearable devices; smart clothing; industrial devices and appliances; manufacturing components and/or appliances; and many existing, conceived and/or as yet unrealized devices capable of generating and communicating and/or receiving data. In particular, devices constituting the so-called "internet of things" (IoT) may generate and communicate and/or receive data over a computer network by communication medium such as wired or wireless broadcast, network or the like.

Data generated and communicated by or to such devices can include sensitive information or information that, when combined with other information, could constitute sensitive, secret, personal or private information. Notably, such information is frequently communicated in plaintext or unencrypted form due to constraints on the computational ability and resources of devices involved in the generation, communication or receipt/consumption of the information.

For example, information about a person can be communicated in unencrypted form by devices used by, detecting or otherwise affected by the person. Such information can include, inter alia: location information; travel information; health information such as heart rate, blood pressure and the like; time information such as time and/or date; personal tastes and preferences such as music preferences; and other information. Plaintext disclosure or observation and recording of any one piece of such information may be considered relatively innocuous for the person concerned, especially in the absence of a direct association between the information and the person such as by an identification of the person. However, a simple aggregation of two or more pieces of information can build an impression, picture or data structure of information concerning the person having a sensitivity greater than a sensitivity of any single piece of data taken alone. In effect, the sensitivity of an aggregate of pieces of information is greater than the sensitivity of its parts.

The protection of information by encryption can alleviate privacy concerns, but many IoT and similar devices are not computationally capable of performing cryptographic key generation, hashing and encryption/decryption functions with sufficient performance for the volume of data involved due to resource constraints of the devices. In particular, the resources required to implement and use Elliptic-curve cryptography (ECC) for timely public-key cryptography can exceed the computational ability of many, for example low-cost, IoT devices. Thus, there is a challenge to protect data in resource constrained systems.

SUMMARY

The present disclosure accordingly provides a computer implemented method of protecting data in a message for communication from a sender to a receiver, the sender and receiver sharing a secret, the method comprising: splitting the message into a number of ordered message blocks, the order being a proper order such that an aggregation of the blocks in the proper order constitutes the message; generating, for each block, an encoded indication of a position of the block in the proper order of blocks, the encoding being reversible and based on at least a hash value for the block, a secret shared between the sender and the receiver, and a position of the block in the proper order; communicating the blocks and the encoded indications to the receiver, the blocks being communicated in an order different than the proper order so as to obfuscate the message, such that the blocks can be reassembled by the receiver in the proper order on the basis of the shared secret; and wherein the number of ordered message blocks is determined on the basis of a performance analysis of a computing device of the sender or receiver, the performance analysis determining a maximum number of hashing operations that can be performed by the computing device while satisfying a predetermined performance criterion for the computing device.

In an embodiment, the performance analysis includes repeatedly invoking a hashing operation iteratively on the computing device for an increasing number of iterations at each repetition to determine the maximum number of hashing operations.

In an embodiment, the number of hashing operations in each repetition is increased exponentially, the method further comprising, responsive to a determination that a performance of the computing device during a repetition fails to satisfy the predetermined performance criterion, adjusting the number of hashing operations for a next repetition to a number used in an immediately preceding repetition, and increasing subsequent repetitions linearly.

In an embodiment, in response to a determination that a performance of the computing device during a repetition having a linearly increased number of iterations fails to satisfy the predetermined performance criterion, determining a number of iterations in an immediately preceding repetition as the maximum number of hashing operations.

In an embodiment, the number of ordered message blocks is determined based on a calculation of a number of hashing operations required to communication a message and the determined maximum number of hashing operations.

In an embodiment, the predetermined performance criterion includes a predetermined maximum resource usage of the computing device.

In an embodiment, the predetermined performance criterion includes a predetermined maximum duration of execution of the computing device in performing at least the generating.

The present disclosure accordingly provides a computer system including a processor and memory storing computer program code for performing the method set out above.

The present disclosure accordingly provides a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION OF EMBODIMENTS

Embodiments of the present disclosure recognize that large volumes of data can be protected by relatively less secure data protection mechanisms dissuading data access since, in spite of a relatively low computation effort required to access an item of data protected by such relatively less secure data protection mechanisms, the sheer volume of occasions when such computation effort is required to be performed to access many such data items is large by virtue of the sheer quantity of data items. Accordingly, embodiments of the present disclosure provide mechanisms for impeding access to data such that greater effort is required than mere reading plaintext data while providing that such mechanisms are operable by resource constrained devices such as low-resource IoT devices and the like. Thus, where an entity interested in "snooping" data communicated by, to or between IoT devices would readily access (and potentially process and/or store) intercepted plaintext data in real-time, a burden introduced by, for example, a computational exercise required before any such intercepted data can fully accessed, serves to protect the data due to the sheer volume of such data.

Embodiments of the present disclosure provide a computation challenge for accessing such data by partitioning the data and rearranging it. The whole content of an original data item is retained but it is partitioned and disorganized. The complexity of the partitioning and rearranging is adaptable in dependence on capabilities of device generating or receiving the data.

Figure 1:
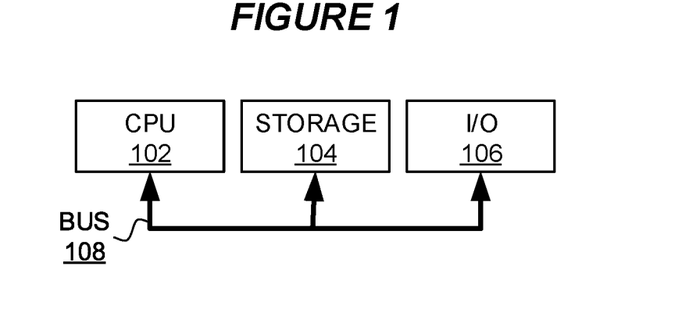
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
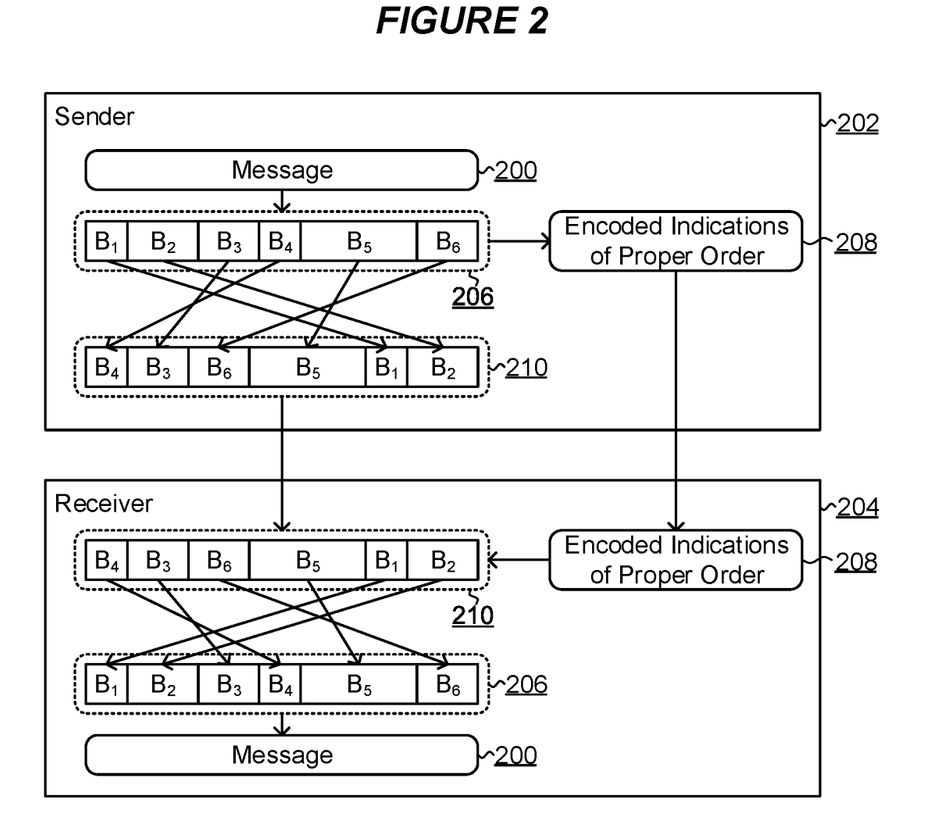
FIG. 2 is a component diagram depicting an arrangement of sender and receiver entities for the communication of a message therebetween in accordance with embodiments of the present disclosure.

FIG. 2 is a component diagram depicting an arrangement of sender 202 and receiver 204 entities for the communication of a message 200 therebetween in accordance with embodiments of the present disclosure. Each of the sender 202 and receiver 204 entities can be any hardware, software, firmware, physical and/or virtualized device, appliance, apparatus or system for the communication of messages therebetween. Communication can take place using any suitable means such as a wired or wireless network, a wired or wireless direct point-to-point connection, a software interface, a data channel or other communication mechanisms as will be apparent to those skilled in the art. Examples of such entities are described above including network connected IoT devices and the like. Notably, the type, nature, configuration or arrangement of the sender 202 and receiver 204 entities need not be similar or consistent between the entities such that disparate entities could be used.

The sender 202 includes a message 200 storing data therein and for communication to the receiver 204. In particular, embodiments of the present disclosure provide for communication of the message 200 to the receiver 204 while providing an impediment to third party, unauthorized or other entities accessing data stored in the message 200 by obfuscating the message 200 in a manner that the data can be readily reconstituted by the receiver 204. By providing an impediment through obfuscation, the resource burden of encryption is not required at either the sender 202 or receiver 204.

FIG. 2 provides a high-level overview of an embodiment of the present disclosure that will be considered in more detail with reference to FIGS. 3 to 6 below. Referring to FIG. 2, the sender 202 splits the message 200 into multiple message blocks 206 $B_1$ to $B_6$ suitable for rearranging to form an obfuscated version of the message 200. A proper order of the blocks 206 is encoded in a series of encoded indications 208. The proper order is an order of the blocks 206 required to constitute the message 200 so that data in the message 200 can be accessed—i.e. the message is not obfuscated when the blocks 206 are arranged in the proper order. An encoded indication 208 is provided for each block in the message blocks 206. Each encoded indication 208 indicates a position of a message block in the proper order in a manner that is reversibly encoded. Embodiments of the present disclosure reversibly encode a position indication for a message block based on at least a hash value evaluated for the message block and a secret that is shared between the sender 202 and receiver 204. The reversibility of the encoding can be achieved, for example, using an exclusive OR (XOR) operation of parameters such as an XOR of a hash value for a block and an indication of a proper position, p, of the block. The hash value of the block can be a hash value of a data content B of the block combined with the shared secret S, such combination being achieved, for example, by a logical OR operation. Thus, using a hashing function H:

$$EI = H(B\|S) \oplus p$$

Encoded Indication $(EI)=H(B\|S)\oplus p$

In this way, the proper position p for a block B can be recovered by reversing the encoding, provided the shared secret S is known, thus:

$$p = H(B\|S) \oplus EI$$

The sender 202 reorders the blocks into a new order of blocks 210 that is different to the proper order. For example, the sender 202 can reorder the blocks 210 into a random order provided the random order is not the proper order. Further, the sender 202 can analyze the new order of blocks 210 to verify it is sufficiently different to the proper order that the message cannot be readily inferred from even the reordered blocks 210. Such analysis can include, for example, determining a proportion of message blocks 206 that are adjacent other message blocks in the proper order and remain so collocated in the reordered blocks 210. Other mechanisms for ensuring sufficient reordering of the message blocks 206 will be apparent to those skilled in the art.

The reordered message blocks 210 and encoded indications 208 are communicated for receipt by the receiver entity 204. The receiver entity decodes the encoded indications 208 by reversing the encoding to determine a position in the proper order for each received block 210. Subsequently, the received blocks 210 can be reordered to the proper order 206 to reconstitute the message 200.

Figure 3:
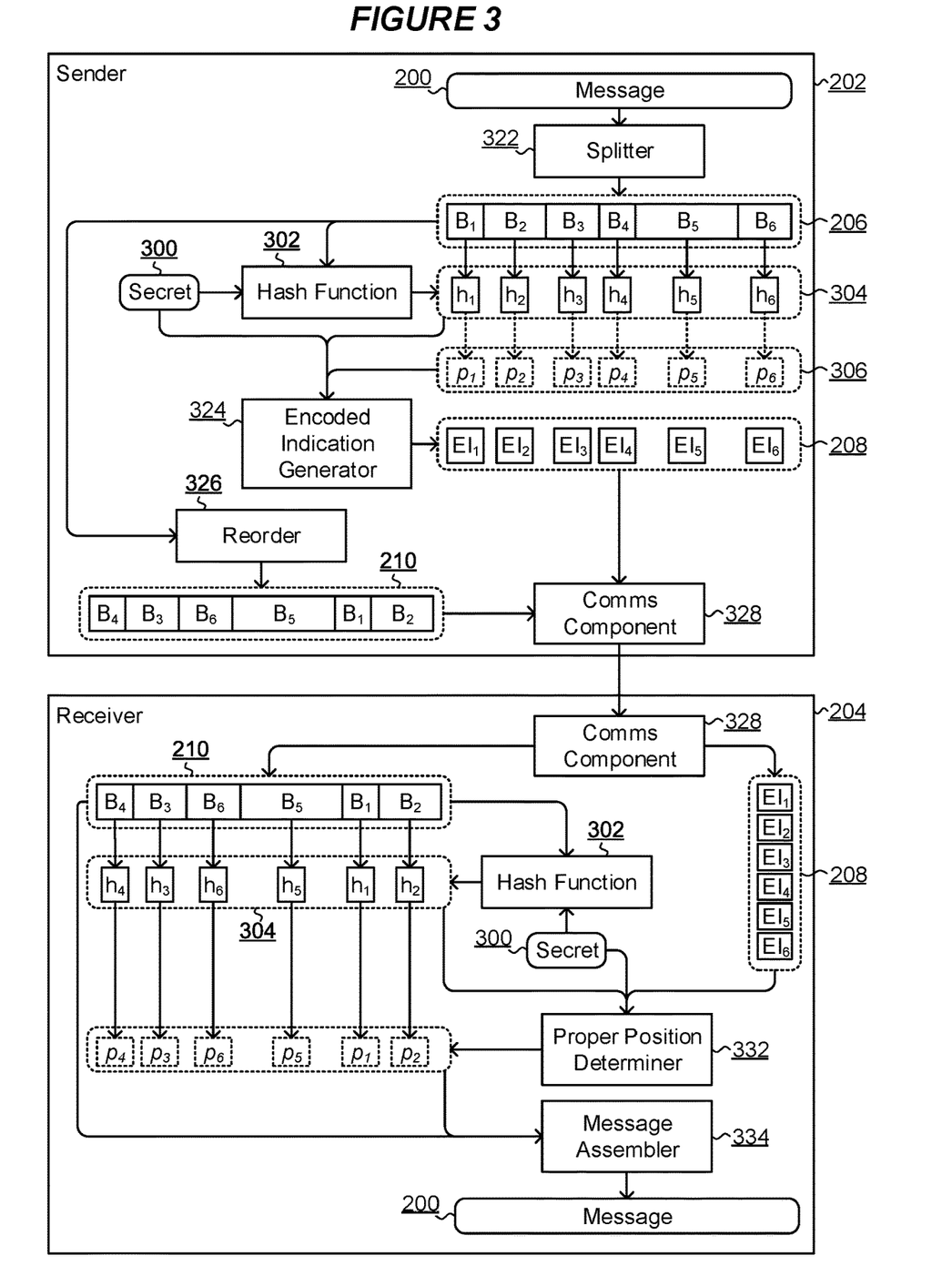
FIG. 3 is a component diagram elaborating that of FIG. 2 depicting an arrangement of sender and receiver entities for the communication of a message therebetween in accordance with embodiments of the present disclosure.

FIG. 3 is a component diagram elaborating that of FIG. 2 depicting an arrangement of sender 202 and receiver 204 entities for the communication of a message 200 therebetween in accordance with embodiments of the present disclosure. FIG. 3 has features in common with those already described with respect to FIG. 2. FIG. 3 includes a splitter component 322 as a hardware, software, firmware or combination component adapted to split the message 200 into message blocks 206 $B_1$ to $B_6$. The message blocks can be fixed or varying size and the particular selection of blocks can be determined based on, for example, an assessment of the sensitivity of data stored in a particular part of the message 200. For example, a message with mainly non-sensitive information and having a number of particularly sensitive parts can be split such that the sensitive parts are stored in smaller blocks as compared to the non-sensitive parts. The message blocks 206 are used to evaluate hash values 305 $h_1$ to $h_6$, one per block. Each hash value is evaluated by a hash function 302 and is evaluated, for a block, on the basis of a combination of data in the block and the shared secret 300. The shared secret 300 can be a key, passphrase or other secret data item that is known to both the sender 202 and receiver 204. In an embodiment, the shared secret is kept secret such as by storing the shared secret in a protected, reserved or otherwise secure area of a memory of each of the sender 202 and receiver 204. Thus, each has value can be evaluated using a hash function 302 H on the basis of data in block $B_n$ and the shared secret 300 S as:

$$h_n = H(B_n\|S)$$

The relationship between a hash value $h_n$ and a block $B_n$ is such that, if the hash values are ordered according to the proper order of the blocks 206 as $h_1 \ldots h_i$, it is possible to determine a proper position $p_n$ of a block $B_n$ in the proper order by evaluating the hash value for the block $h_n$ (on the basis of the block data and the shared secret S) and comparing with the ordered list of hash values $h_1 \ldots h_i$. This constitutes a ready approach to determining the proper order $p_1 \ldots p_i$ as depicted in FIG. 3 as proper order 306. However, even more secure approaches to encoding the proper order are outlined below.

As illustrated in FIG. 3, the hash values 304 (ordered according to the proper order 306) and shared secret 300 are used by an encoded indication generator 324 to generate a set of encoded indications 208, each encoded indication $EI_n$ indicating a proper position $p_n$ of a message block $B_n$ in the proper order of message blocks. In an embodiment, each encoded indication $EI_n$ is reversibly encoded by an exclusive OR (XOR) operation on a further hash value and a proper position $p_n$ for a block $B_n$. The further hash value is a hash of the already evaluated hash value $h_n$ for the block $B_n$ further combined with the secret 300. Thus, according to the embodiment, an encoded indication $EI_n$ can be expressed as:

$$EI_n = H(h_n\|S) \oplus p_n$$

In this way, decoding the position $p_n$ for a block $B_n$ can be achieved by:

$$p_n = H(h_n\|S) \oplus EI_n$$

or, for completeness:

$$p_n = H(H(B_n\|S)\|S) \oplus EI_n$$

Such nested hashing providing increased security of the encoding and offering further benefits as will be described below with respect to embodiments of FIG. 4, while remaining reversible.

Returning to FIG. 3, the message blocks 206 are subsequently reordered by the sender 202 using a reorder function or facility 326. Such reordering can take place, for example, as previously described with respect to FIG. 2, to arrive at a reordered set of message blocks 210. The message blocks in the new order (reordered) and the set of encoded indications 208 are then communicated to the receiver 204 via communications components 328 at each of the sender 202 and receiver 204. For example, the communications component 328 can provide wired or wireless network or point-to-point communications between the sender 202 and receiver 204.

Turning now to the operation of the receiver 204 in FIG. 3, the receiver 204 receives the message blocks 210 in the new order (i.e. not the proper order) and the encoded indications 208. The receiver 208 determines the proper position $p_n$ for each block $B_n$ based on an encoded indication $EI_n$ using a proper position determiner 332 as a hardware, software, firmware or combination component. The proper position determiner 332 decodes each $EI_n$ using the hash function 302 and shared secret 300 to determine the proper position $p_n$ for each block $B_n$, such as using the expressions provided above. Subsequently, a message assembler component 334 reorders the message blocks 210 into the proper order so as to reconstitute the original message 200 at the receiver 204.

Figure 4:
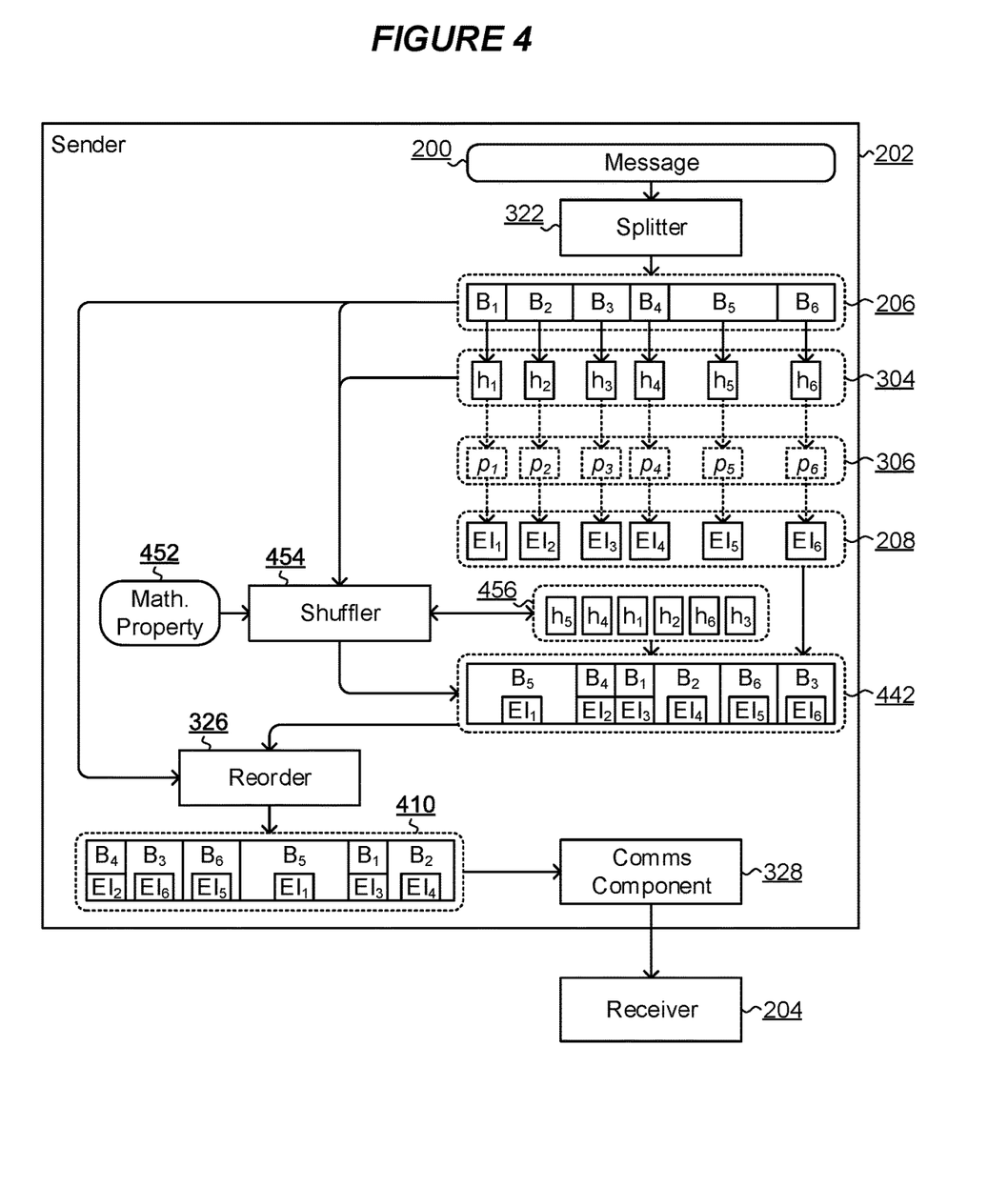
FIG. 4 is a component diagram of a sender entity according to an embodiment of the present disclosure.

FIG. 4 is a component diagram of a sender entity 202 according to an embodiment of the present disclosure in which additional security is provided to reduce a prospect of malicious, unauthorized or unintended decoding of the encoded indications 208 that would render the message 200 vulnerable to unauthorized or undesired access. Many of the elements of FIG. 4 are identical to those described above with respect to FIGS. 2 and 3 and these will not be repeated here. Additionally, FIG. 4 depicts an enhanced mechanism for communicating the encoded indications 208 in a manner that protects against their exposure. The sender 202 of FIG. 4 further includes a shuffler component 454 as a hardware, software, firmware or combination component adapted to shuffle the message blocks $B_1 \ldots B_i$ of the message 200 according to a mathematical property 452 that is shared between the sender 202 and the receiver 204. For example, according to an embodiment, the shuffler 454 forms a shuffled version of the message by rearranging message blocks $B_1 \ldots B_i$ based on values of hashes $h_1 \ldots h_i$, where the mathematical property 452 defines how the blocks are shuffled based on the hash values $h_1 \ldots h_i$. In one embodiment, the mathematical property 452 is "no decreasing order" in order to shuffle the message blocks $B_1 \ldots B_i$ according to an increasing order of the hash values $h_1 \ldots h_i$ corresponding to the message blocks. Alternative mathematical properties will be apparent to those skilled in the art. Thus, the hash values $h_1 \ldots h_i$ are ordered 456 according to the mathematical property 452, and the blocks $B_1 \ldots B_i$ are similarly so ordered to constitute a shuffled version 442 of the message 200.

Further, the shuffled version 442 of the message is used to communicate the encoded indications $EI_1 \ldots EI_i$ to the receiver 204. In an embodiment, the encoded indications $EI_1 \ldots EI_i$ are spread across the blocks $B_1 \ldots B_i$ as shuffled in the shuffled version 442. Notably, the order of the encoded indications as they are spread across the shuffled message blocks is the proper order so that, if the receiver 204 is able to reconstitute the shuffled message 422, it is also able to determine the proper order of the encoded indications 208 and ultimately the proper order of the message blocks $B_1 \ldots B_i$.

In the embodiment, the encoded indications 208 as spread across the shuffled message blocks 442. This provides a mechanism for securely communicating the encoded indications 208 to the receiver 204 by including, associating or referencing an encoded indication with a message block as communicated to the receiver 204. It is emphasized that, in this embodiment, the order of the encoded indications 208 as they are spread across the blocks in the shuffled message 442 is the proper order, though the order of the blocks in the shuffled message 442 is not necessarily (and in an embodiment is not) the proper order and is instead defined on the basis of the mathematical property 452 and the hash values $h_1 \ldots h_i$ for the blocks $B_1 \ldots B_i$. Furthermore, it is emphasized that the order of the blocks in the shuffled message 442 is not necessarily (and in an embodiment is not) the same as the reordered message blocks 410 as defined by the reorder component 326, such reordered message blocks 410 being, in one embodiment, a random order of message blocks. Thus, the challenge for the receiver to generate the shuffled message 442 in order to determine a correct order of the encoded indications 208 is additional to the existing challenge of then decoding the encoded indications 208 to determine the proper order of the message blocks 206 to reconstitute the message 200.

Figure 5:
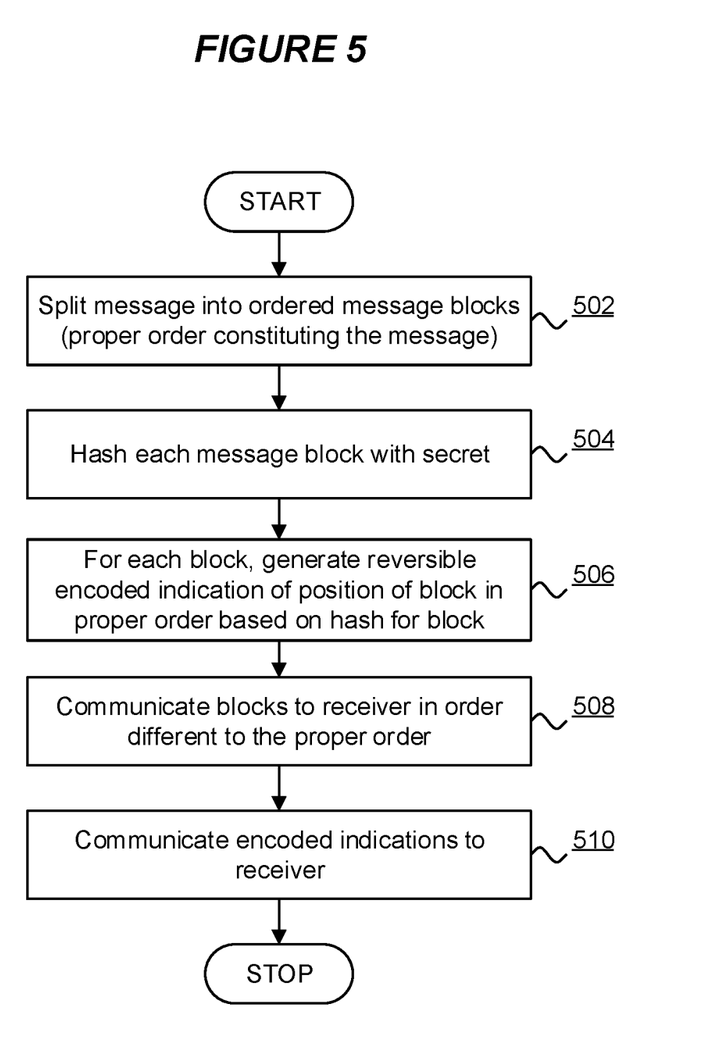
FIG. 5 is a flowchart of a method of a sender entity for protecting data in a message for communication from the sender to a receiver entity.

FIG. 5 is a flowchart of a method of a sender entity 202 for protecting data in a message 200 for communication from the sender 202 to a receiver 204 entity. Initially, at 502, the method splits the message 200 into a plurality of ordered message blocks 206, the order being a proper order such that an aggregation of the blocks in the proper order constitutes the message 200. At 504 the method generates a hash value for each message block, each hash value being generated on the basis of at least a content of the block and a shared secret 300. At 506 the method generates, for each block, an encoded indication 208 of a position 306 of the block in the proper order of blocks, the encoding being reversible and based on at least the hash value for the block and a position of the block in the proper order. At 508 the method communicates the blocks to the receiver in an order different to the proper order so as to obfuscate the message. At 510 the method communicates the encoded indications to the receiver such that the blocks can be reassembled by the receiver in the proper order on the basis of the shared secret. Notably, the communications at 508 and 510 can be combined according to the shuffling embodiments described with respect to FIG. 4.

Figure 6:
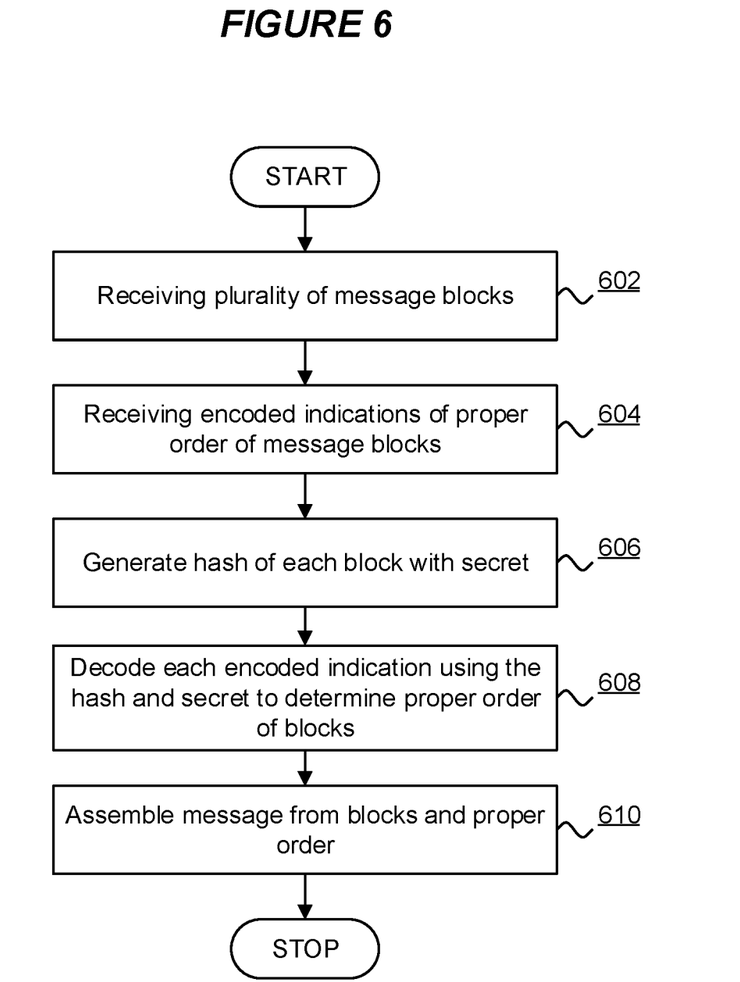
FIG. 6 is a flowchart of a method of a receiver entity for protecting data in a message for communication from a sender to the receiver entity.

FIG. 6 is a flowchart of a method of a receiver entity 204 for protecting data in a message 200 for communication from a sender 202 to the receiver entity 204. Initially, at 602, the method receives the message 200 obfuscated as a plurality of message blocks 210 such that an aggregation of the blocks 210 in a proper order constitutes the message 200. Notably, the message blocks are received in an order different to the proper order. At 604 the method receives, for each block, an encoded indication of a position of the block in the proper order. The encoding of the indication is reversible and based on at least a hash value for the block and the shared secret and a position of the block in the proper order. Notably, the receiving of blocks and encoded indications at 602 and 604 can be combined according to the shuffling embodiments described with respect to FIG. 4. At 606 the method generates a hash value for each message block, each hash value being generated on the basis of at least a content of the block and the secret. At 608 the method decodes each encoded indication using the hash value and the secret to determine the proper order of the blocks. At 610 the method assembles the message 200 from the blocks on the basis of the determined proper order.

Embodiments of the present disclosure thus involve hashing operations using hashing functions such as MD5, SHA-1, SHA2 or other functions as will be apparent to those skilled in the art. Devices involved in sending and/or receiving messages can be considerably resource constrained such that even the execution of a hashing function can be challenging. In particular, the time and resource required in some devices to perform the multiple required hashing operations can be unacceptable in some use cases. For example, a predetermined performance criterion or criteria can be defined for a sender and/or receiver device. Such performance criteria can include, for example, a predetermined maximum resource usage of the device such as a maximum amount of memory, processor or network resource that can be used by the device in undertaking the sending or receiving operation according to embodiments of the present disclosure. Additionally or alternatively, the predetermined performance criterion can include a maximum duration of execution of the device in performing one or more functions according to embodiments of the present disclosure, such as the 506 of generating a reversible encoded indication of the proper order of message blocks.

According to some embodiments of the present disclosure, techniques are provided for satisfying a predetermined performance criterion by adjusting the number of hashing operations that are performed by a device involved in or with the sender 202 or receiver 204 components. This adjustment is achieved by selecting a number of message blocks to be used when splitting the message 200 such that a greater number of message blocks necessarily involves an increased number of message block processes including hashing operations, whereas a reduced number of message blocks necessarily involves a reduced number of such operations. Accordingly, embodiments of the present disclosure provide for a determination of a maximum number of hashing operations that can be performed by a device while satisfying a predetermined performance criterion for the device.

Figure 7:
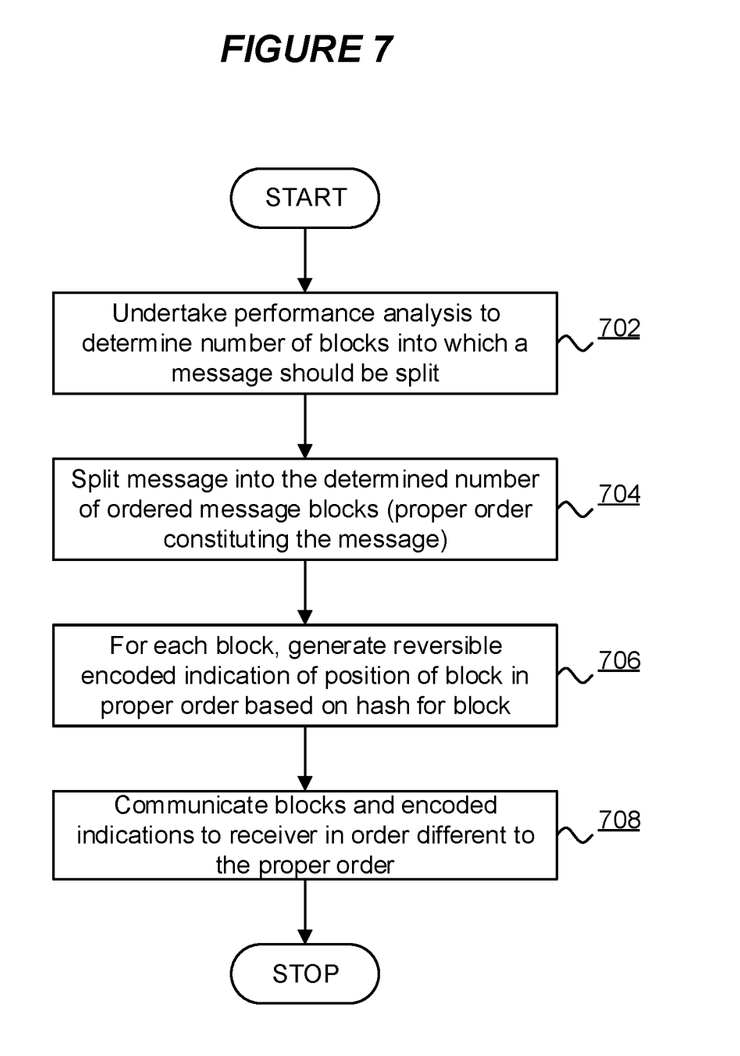
FIG. 7 is a flowchart of a method of a sender entity for protecting data in a message for communication while satisfying a performance criterion according to an embodiment of the present disclosure.

FIG. 7 is a flowchart of a method of a sender entity 202 for protecting data in a message 200 for communication while satisfying a performance criterion according to an embodiment of the present disclosure. Initially, at 702, the method undertakes a performance analysis to determine a number of blocks into which a message should be split in order that a predetermined performance criterion is satisfied when performing the remainder of the method. The performance analysis will be described in more detail below. Subsequently, at 704, the method splits a message 200 into the determined number of ordered message blocks, the order being a proper order such that an aggregation of the blocks in the proper order constitutes the message. At 706 the method generates, for each block, an encoded indication of a position of the block in the proper order of blocks, the encoding being reversible and based on at least a hash value for the block, a secret shared between the sender and the receiver, and a position of the block in the proper order. At 708 the method communicates the blocks and the encoded indications to the receiver, the blocks being communicated in an order different to the proper order so as to obfuscate the message, such that the blocks can be reassembled by the receiver in the proper order on the basis of the shared secret.

704 to 708 are substantially as previously described and these will not be further elaborated here. 702 is concerned with determining a number of ordered message blocks into which to split the message 200 to remain in compliance with, or satisfying, a predetermined performance criterion. According to an embodiment, the determination of 702 is made by testing, for a device, a number of hashing operations the device can undertake while satisfying the performance criterion. In an embodiment, this involves repetition of a test in which a number of hashing operations is iteratively performed such that, at each repetition, the number of iterations of hashing increases. Monitoring for compliance with the performance criterion is undertaken continually such that, when the performance criterion is no longer complied with, the method can determine that a maximum number of hashing operations has been exceeded and a reduced number must be considered.

In an embodiment, a number of hashing operations in each repetition is increased exponentially. At a repetition where the performance criterion fails to be satisfied, the method can revert to an immediately preceding number of iterations (for a repetition before that which failed to satisfy the performance criterion) and proceed with repetitions increasing a number of iterations linearly. Subsequently, when the performance of the device during a repetition having a linearly increased number of iterations fails to be satisfy the performance criterion, the maximum number of iterations can be determined based on the number of iterations of an immediately preceding repetition. In some embodiments, the rate of linear increase can be reduced to fine tune the identification of a maximum number of iterations of the hashing algorithm that continues to satisfy the performance criterion.

When a maximum number of hashing iterations has been determined it is necessary to determine a corresponding number of message blocks into which the message should be split. Each message block will involve the undertaking of one or more hashing operations in dependence on the particular embodiment employed such as those aforementioned embodiments. Thus, the number of hashing operations per message block can be evaluated or, at least, estimated, and accordingly a number of message blocks for a determined maximum number of hashing iterations can be calculated.

Figure 8:
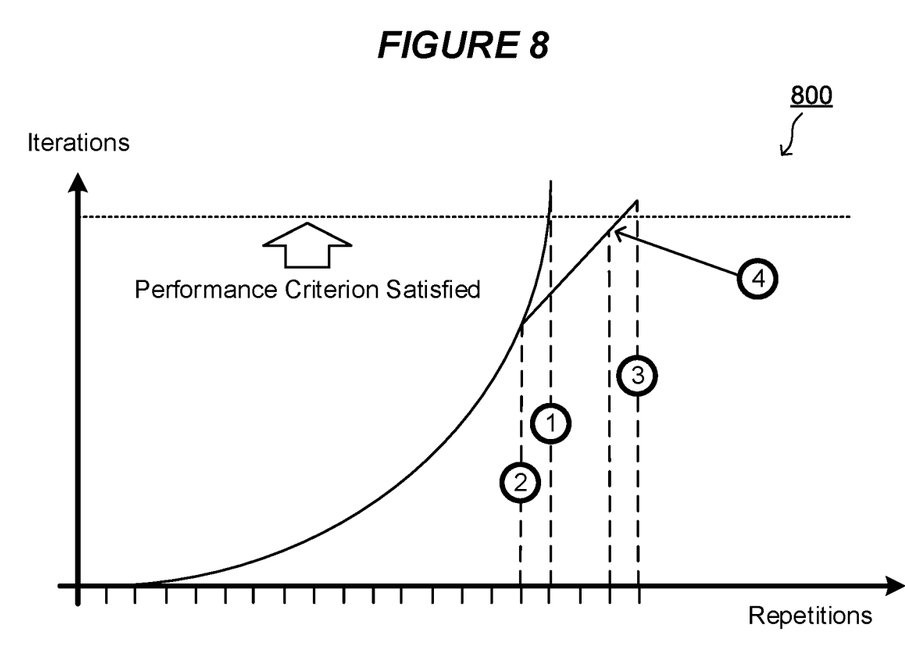
FIG. 8 is plot indicating a maximum number of hash function iterations satisfying a performance criterion for undertaking methods of the present disclosure according to an embodiment.

FIG. 8 is an plot 800 indicating a maximum number of hash function iterations satisfying a performance criterion for undertaking methods of the present disclosure according to an embodiment. FIG. 8 depicts multiple repetitions of performing multiple iterations of a hashing operation for a device. Up until marker (1) in FIG. 8 the number of iterations increases exponentially (the graph not being drawn to accurate scale) to the repetition marked (1) at which the number of iterations is such that the performance criterion is no longer satisfied. The method then reverts to the number of iterations performed at the immediately preceding repetition marked (2). From this immediately preceding repetition, the method proceeds with a linear increase in iterations at a predetermined gradient until the performance criterion once again fails to be satisfied at the repetition marked (3). The method then reverts to the number of iterations performed at the immediately preceding repetition marked (4) which is, in the embodiment, determined to be the maximum number of iterations. Thus, a number of message blocks can be calculated for the device based on the number of hashing operations required per message block and the determined maximum number of hashing iterations indicated at marker (4) in FIG. 8.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of protecting data in a message for communication from a sender to a receiver, the sender and the receiver sharing a secret, the method comprising:
splitting the message into a number of ordered message blocks, the order being a proper order such that an aggregation of the blocks in the proper order constitutes the message, and the blocks being of variable size, with sensitive parts of the message stored in smaller blocks as compared to non-sensitive parts of the message;
generating, for each block, an encoded indication of a position of the block in the proper order of blocks, the encoding being reversible and based on at least a hash value for the block, a secret shared between the sender and the receiver, and a position of the block in the proper order;
communicating the blocks and the encoded indications to the receiver, the blocks being communicated in an order different than the proper order so as to obfuscate the message, such that the blocks can be reassembled by the receiver in the proper order on the basis of the shared secret; and
wherein the number of ordered message blocks is determined on the basis of a performance analysis of a computing device of the sender or the receiver, the performance analysis determining a maximum number of hashing operations that can be performed by the computing device while satisfying a predetermined performance criterion for the computing device.

2. The method of claim 1, wherein the performance analysis includes repeatedly invoking a hashing operation iteratively on the computing device for an increasing number of iterations at each repetition to determine the maximum number of hashing operations.

3. The method of claim 2, wherein the number of hashing operations in each repetition is increased exponentially, the method further comprising, responsive to a determination that a performance of the computing device during a repetition fails to satisfy the predetermined performance criterion, adjusting the number of hashing operations for a next repetition to a number used in an immediately preceding repetition, and increasing subsequent repetitions linearly.

4. The method of claim 3, wherein, in response to a determination that a performance of the computing device during a repetition having a linearly increased number of iterations fails to satisfy the predetermined performance criterion, determining a number of iterations in an immediately preceding repetition as the maximum number of hashing operations.

5. The method of claim 1, wherein the number of ordered message blocks is determined based on a calculation of a number of hashing operations required to communication a message and the determined maximum number of hashing operations.

6. The method of claim 1, wherein the predetermined performance criterion includes a predetermined maximum resource usage of the computing device.

7. The method of claim 1, wherein the predetermined performance criterion includes a predetermined maximum duration of execution of the computing device in performing at least the generating.

8. A computer system comprising:
a processor and memory storing computer program code for protecting data in a message for communication from a sender to a receiver, the sender and the receiver sharing a secret, by:
splitting the message into a number of ordered message blocks, the order being a proper order such that an aggregation of the blocks in the proper order constitutes the message, and the blocks being of variable size, with sensitive parts of the message stored in smaller blocks as compared to non-sensitive parts of the message;
generating, for each block, an encoded indication of a position of the block in the proper order of blocks, the encoding being reversible and based on at least a hash value for the block, a secret shared between the sender and the receiver, and a position of the block in the proper order;
communicating the blocks and the encoded indications to the receiver, the blocks being communicated in an order different than the proper order so as to obfuscate the message, such that the blocks can be reassembled by the receiver in the proper order on the basis of the shared secret; and
wherein the number of ordered message blocks is determined on the basis of a performance analysis of a computing device of the sender or the receiver, the performance analysis determining a maximum number of hashing operations that can be performed by the computing device while satisfying a predetermined performance criterion for the computing device.

9. A non-transitory computer readable storage medium storing computer program code to, when loaded into a computer system and executed thereon, cause the computer to protect data in a message for communication from a sender to a receiver, the sender and the receiver sharing a secret, by:
splitting the message into a number of ordered message blocks, the order being a proper order such that an aggregation of the blocks in the proper order constitutes the message, and the blocks being of variable size, with sensitive parts of the message stored in smaller blocks as compared to non-sensitive parts of the message;
generating, for each block, an encoded indication of a position of the block in the proper order of blocks, the encoding being reversible and based on at least a hash value for the block, a secret shared between the sender and the receiver, and a position of the block in the proper order;
communicating the blocks and the encoded indications to the receiver, the blocks being communicated in an order different than the proper order so as to obfuscate the message, such that the blocks can be reassembled by the receiver in the proper order on the basis of the shared secret; and
wherein the number of ordered message blocks is determined on the basis of a performance analysis of a computing device of the sender or the receiver, the performance analysis determining a maximum number of hashing operations that can be performed by the computing device while satisfying a predetermined performance criterion for the computing device.

10. The method of claim 1, wherein the hash value for a block is a hash value of a data content of the block combined with the shared secret.

11. The method of claim 1, further comprising verifying that the order in which the blocks are communicated is different from the proper order.

12. The method of claim 11, wherein the verifying comprises determining a proportion of message blocks that are adjacent other message blocks in the proper order and remain so collocated in the re-ordered blocks.

13. The method of claim 1, wherein the encoded indication is reversibly encoded by an XOR operation on a hash of the already evaluated hash value for the block further combined with the secret.

14. The method of claim 1, wherein the order of communication of the blocks is shuffled based on values of hashes corresponding to the blocks.

* * * * *

UNITED STATES PATENT AND TRADEMARK OFFICE
CERTIFICATE OF CORRECTION

PATENT NO. : 11,924,327 B2
APPLICATION NO. : 17/310015
DATED : March 5, 2024
INVENTOR(S) : Fadi El-Moussa et al.

It is certified that error appears in the above-identified patent and that said Letters Patent is hereby corrected as shown below:

On the Title Page

On the page 2, in Column 2, under "Other Publications", Line 32, delete "BasedCloud" and insert -- Based Cloud --.

On the page 2, in Column 2, under "Other Publications", Line 32, delete "BasedCloud" and insert -- Based Cloud --.

On the page 2, in Column 2, under "Other Publications", Line 43, delete "al.,"A" and insert -- al., "A --.

On the page 2, in Column 2, under "Other Publications", Line 44, delete "DataHosted" and insert -- Data Hosted --.

On the page 2, in Column 2, under "Other Publications", Line 46, delete "EncryptedData,"" and insert -- Encrypted Data," --.

On the page 3, in Column 1, under "Other Publications", Line 4, delete "OverOutsourced" and insert -- Over Outsourced --.

In the Specification

In Column 5, Line 19, after "adjacent" insert -- to --.

In Column 8, Line 32, delete "MDS," and insert -- MD5, --.

In Column 8, Line 33, delete "SHA2" and insert -- SHA-2 --.

Signed and Sealed this
Fourth Day of June, 2024

Katherine Kelly Vidal
*Director of the United States Patent and Trademark Office*

CERTIFICATE OF CORRECTION (continued)
U.S. Pat. No. 11,924,327 B2

In the Claims

In Column 11, Line 41, in Claim 3, delete "fora" and insert -- for a --.

In Column 13, Line 1, in Claim 12, after "adjacent" insert -- to --.